United States Patent
Ichimiya

(10) Patent No.: US 8,532,478 B2
(45) Date of Patent: Sep. 10, 2013

(54) IMAGE PICKUP APPARATUS CAPABLE OF SELECTING FOCUS DETECTION AREA

(75) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/829,579

(22) Filed: Jul. 2, 2010

(65) Prior Publication Data

US 2011/0008033 A1  Jan. 13, 2011

(30) Foreign Application Priority Data

Jul. 13, 2009 (JP) ................................. 2009-164325

(51) Int. Cl.
G03B 3/10 (2006.01)

(52) U.S. Cl.
USPC ........................................................ 396/121

(58) Field of Classification Search
USPC ............ 396/96, 121–123, 128, 103; 348/345
See application file for complete search history.

(56) References Cited

U.S. PATENT DOCUMENTS

| | | | |
|---|---|---|---|
| 5,654,790 A | 8/1997 | Uchiyama | |
| 6,522,394 B2 * | 2/2003 | Ichimiya | 356/3.06 |

FOREIGN PATENT DOCUMENTS

| | | |
|---|---|---|
| JP | 08-015603 | 1/1996 |
| JP | 08-262317 A | 11/1996 |
| JP | 2002-062967 A | 2/2002 |
| JP | 2008-107668 A | 5/2008 |

* cited by examiner

Primary Examiner — WB Perkey
Assistant Examiner — Minh Phan
(74) Attorney, Agent, or Firm — Cowan, Liebowitz & Latman, P.C.

(57) ABSTRACT

An image pickup apparatus 101 includes a line sensor constituted by a plurality of photoelectric conversion elements and capable of performing a photoelectric conversion of a pair of object images formed by luminous flux from an image pickup optical system 102, focus detectors 105 and 118 which detect a focus state of the image pickup optical system based on a pair of image signals outputted from the line sensor, and a block dividing portion 118 which divides the line sensor into a plurality of photoelectric conversion element blocks to form a plurality of effective focus detection areas in an image taking region. The block dividing portion changes a pattern by which the line sensor is divided into the plurality of photoelectric conversion element blocks so that an arrangement of the effective focus detection areas in the image taking region is switched in accordance with an operation by a user.

8 Claims, 10 Drawing Sheets

IMAGE PICKUP APPARATUS CAPABLE OF SELECTING FOCUS DETECTION AREA

BACKGROUND OF THE INVENTION

1. Field of the Invention

The present invention relates to an image pickup apparatus capable of selecting a focus detection area (focus detection point).

2. Description of the Related Art

In many image pickup apparatus such as a single-lens reflex camera, the autofocus by a TTL phase difference detection method can be performed. In the TTL phase difference detection method, a pair of object images are formed by dividing luminous flux from an area corresponding to a focus detection point set in an image taking region of an image pickup optical system, and a pair of image signals are obtained by performing a photoelectric conversion of the pair of object images by a line sensor (a photo electric conversion element array). Then, a defocus amount of the image pickup optical system is obtained based on a phase difference of the pair of image signals and a focus lens is moved by a movement amount obtained based on the defocus amount to obtain an in-focus state.

In many cases, a plurality of focus detection points (also referred to as focus detection areas) are provided in the image taking region. In this case, the focus detection is performed by using the focus detection point automatically selected by the image pickup apparatus or arbitrarily selected by a user out of the plurality of focus detection points.

Furthermore, in order to increase the flexibility of selecting a composition at the time of taking an image, it is preferable that as many focus detection points as possible are densely arranged in the image taking region. In order to increase the number of the focus detection points, for example as illustrated in FIG. 10A, there is a method in which one long line sensor is divided into a plurality of (five) photoelectric conversion element blocks Line1 to Line5 to form one focus detection point by each photoelectric conversion element block.

However, in the method of dividing the line sensor illustrated in FIG. 10A, the length of the photoelectric conversion element block per one focus detection point is short, and therefore a range of a detectable defocus amount is narrow.

On the other hand, as illustrated in FIG. 10B, if the photoelectric conversion element blocks are set so as to be overlapped with each other, the length of the photoelectric conversion element block per one focus detection point can be enlarged. In this case, a charge accumulation control of the long line sensor is performed at once and an image signal section corresponding to one of the photoelectric conversion blocks is extracted from an image signal read from the line sensor to perform focus detection at one focus detection point using the image signal section.

In Japanese Patent Laid-open No. H08-15603, an image pickup apparatus which performs focus detection by a method as illustrated in FIG. 10B is proposed. In the image pickup apparatus, whether near and far objects are generated at one focus detection point is determined. If it is determined that the near and far objects are generated at the one focus detection point, the method of dividing the photoelectric conversion element blocks is changed, i.e. the positions of the photoelectric conversion element blocks are displaced, to perform the focus detection again.

As disclosed in Japanese Patent Laid-open No. H08-15603, the positions of the photoelectric conversion element blocks are displaced to be able to variously change a position of a focus detection point.

However, even if the positions of photoelectric conversion elements are displaced, an optimal charge accumulation control cannot be performed for each photoelectric conversion element block if there is an overlapped portion between the plurality of photoelectric conversion element blocks. If the charge accumulation control is not optimized for each photoelectric conversion element block, reliable focus detection cannot be performed because a good image signal cannot be obtained.

For example, as illustrated in FIG. 11, a case where a bright object image is formed on a photoelectric conversion element block Line1 and also a dark object image is formed on a photoelectric conversion element block Line2 will be described. In this case, when the optimal charge accumulation control is performed for the photoelectric conversion element block Line1, an image signal having sufficient amplitude cannot be obtained from the photoelectric conversion element block Line2. On the other hand, when the optimal charge accumulation control is performed for the photoelectric conversion element block Line2, an image signal of the photoelectric conversion element block Line1 is saturated. In both cases, a good image signal cannot be obtained.

In order to resolve such problems, as illustrated in FIG. 12, a method of switching and using a division pattern A by which one long line sensor is divided into three photoelectric conversion element blocks and a division pattern B by which the sensor is divided into two electric conversion element blocks is considered. According to the method, an optimal charge accumulation control can be performed for each photoelectric conversion element block because five focus detection points can be formed and there is no overlapped region between the photoelectric conversion element blocks.

However, in this method, a plurality of charge accumulation operations, i.e. charge accumulation operations using the division pattern A and the division pattern B are necessary. Therefore, the time required for the AF increases.

SUMMARY OF THE INVENTION

The present invention provides an image pickup apparatus which is configured to obtain a reliable focus detection result without increasing the time required for the AF when a division setting of a plurality of photoelectric conversion element blocks is performed in a line sensor.

An image pickup apparatus as one aspect of the present invention includes a line sensor constituted by a plurality of photoelectric conversion elements and capable of performing a photoelectric conversion of a pair of object images formed by luminous flux from an image pickup optical system, a focus detector configured to detect a focus state of the image pickup optical system based on a pair of image signals outputted from the line sensor performing the photoelectric conversion of the pair of object images, and a block dividing portion configured to divide the line sensor into a plurality of photoelectric conversion element blocks to form a plurality of effective focus detection areas in an image taking region. The block dividing portion changes a pattern by which the line sensor is divided into the plurality of photoelectric conversion element blocks so that an arrangement of the effective focus detection areas in the image taking region is switched in accordance with an operation by a user.

An image pickup apparatus as another aspect of the present invention includes a first line sensor and a second line sensor constituted by a plurality of photoelectric conversion elements arranged in first and second directions respectively, and capable of performing a photoelectric conversion of a pair of object images formed by luminous flux from an image pickup optical system, a focus detector configured to detect a focus state of the image pickup optical system based on a pair of image signals outputted from each of the first and second line sensors performing the photoelectric conversion of the pair of object images, and a block dividing portion configured to divide the first line sensor into a plurality of photoelectric conversion element blocks to form a plurality of effective focus detection areas in the first direction in an image taking region. The block dividing portion changes a pattern by which the first line sensor is divided into the plurality of photoelectric conversion element blocks so that an arrangement of the effective focus detection areas is switched in accordance with the focus state detected based on the image signals outputted from the second line sensor.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Embodiment 1

Figure 2:
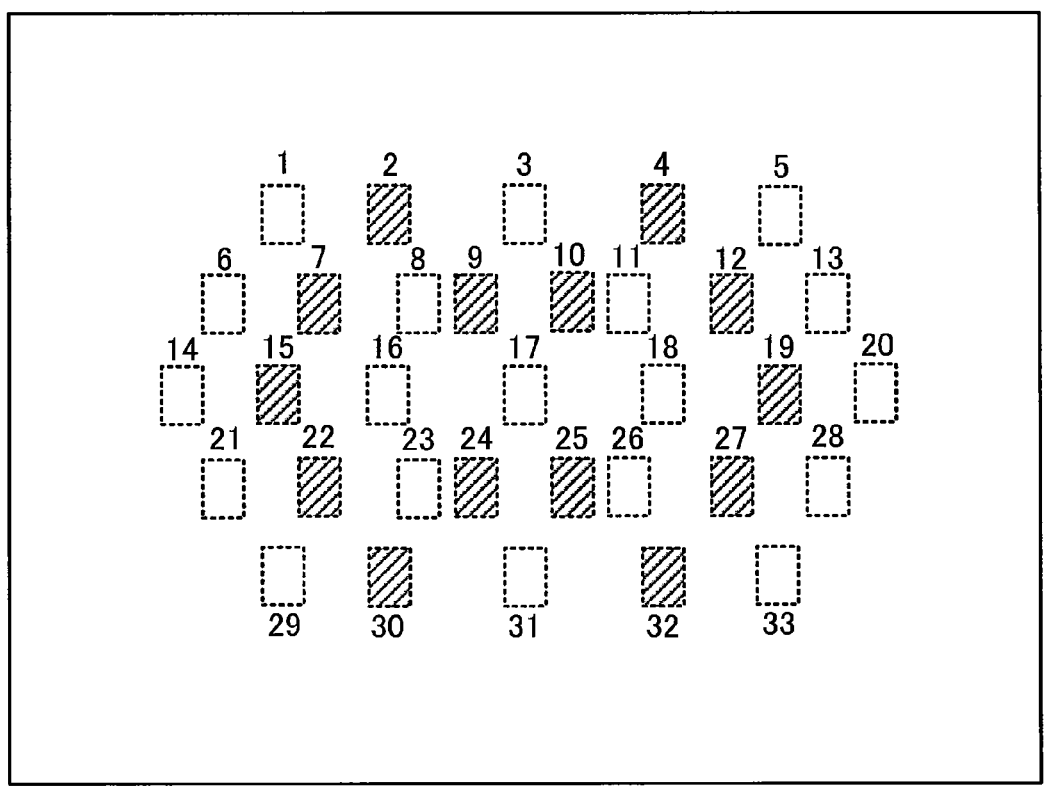
FIG. 2 is a diagram illustrating a layout of focus detection points in a camera of Embodiment 1.

In the following embodiment, as illustrated in FIG. 2, a single-lens reflex camera (an image pickup apparatus) where thirty-three focus detection points (focus detection areas) are arranged in an image taking region (in a finder) will be described as an example.

Figure 13A:
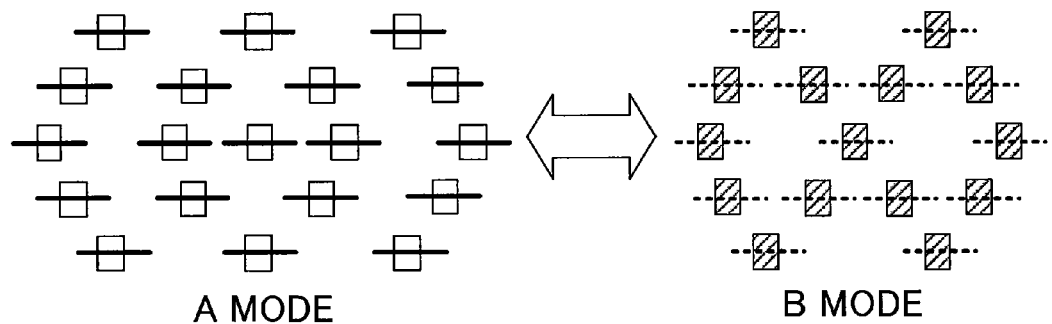
FIGS. 13A and 13B are diagrams illustrating line sensors (horizontal lines) in a camera of Embodiment 1.

As illustrated in the left side in FIG. 13A, the camera is capable of setting an A mode, as an arrangement mode of focus detection points, including nineteen focus detection points as effective focus detection points (effective focus detection areas) among the thirty-three focus detection points. As another arrangement mode of focus detection points, the camera is also capable of selecting a B mode including fifteen focus detection points as the effective focus detection points among the thirty-three focus detection points. The effective focus detection point (the effective focus detection point) means a focus detection point selectable as a used focus detection point (a used focus detection area). The used focus detection point is a focus detection point where an AF is to be performed with respect to an object existing at the focus detection point.

Each of the nineteen effective focus detection points in the A mode and the fifteen effective focus detection points in the B mode is arranged so that the effective focus detection points in one of the modes fill gaps between the effective focus detection points in the other mode, except for a common effective focus detection point which is positioned at a center.

Figure 13B:
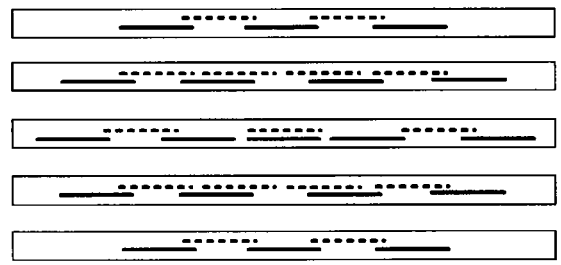

The A mode and the B mode, as illustrated in FIG. 13B, have different division patterns (hereinafter, referred to as block division patterns) of a photoelectric conversion element block in a plurality of long line sensors (five line sensors in the embodiment) extended in a horizontal direction and arranged in upward and downward directions.

Each line sensor is configured so that a plurality of photoelectric conversion elements are arranged in a horizontal direction, and is able to perform a photoelectric conversion of a pair of object images described below formed by luminous flux from an image pickup optical system. Each group in a case where a plurality of photoelectric conversion elements constituting each line sensor are divided into groups each including at least two photoelectric conversion elements is referred to as "a photoelectric conversion element block". "The block division pattern" is a way of dividing the photo electric conversion element block.

In FIG. 13B, a block division pattern in the A mode is indicated by a bold solid line, and a block division pattern in the B mode is indicated by a bold dotted line. Each of the block division patterns in the A mode and the B mode is set so that a photoelectric conversion element block in one mode fills a gap between photoelectric conversion element blocks in the other mode, except for a common photoelectric conversion element block which is positioned at a center.

Thus, each of the plurality of line sensors is divided into the plurality of photoelectric conversion element blocks to be able to form the plurality of effective focus detection points in the image taking region. Then, the block division pattern is changed (switched) to be able to shift positions of the plurality of effective focus detection points (except for the focus detection point which is positioned at a center) in the image taking region.

Figure 1:
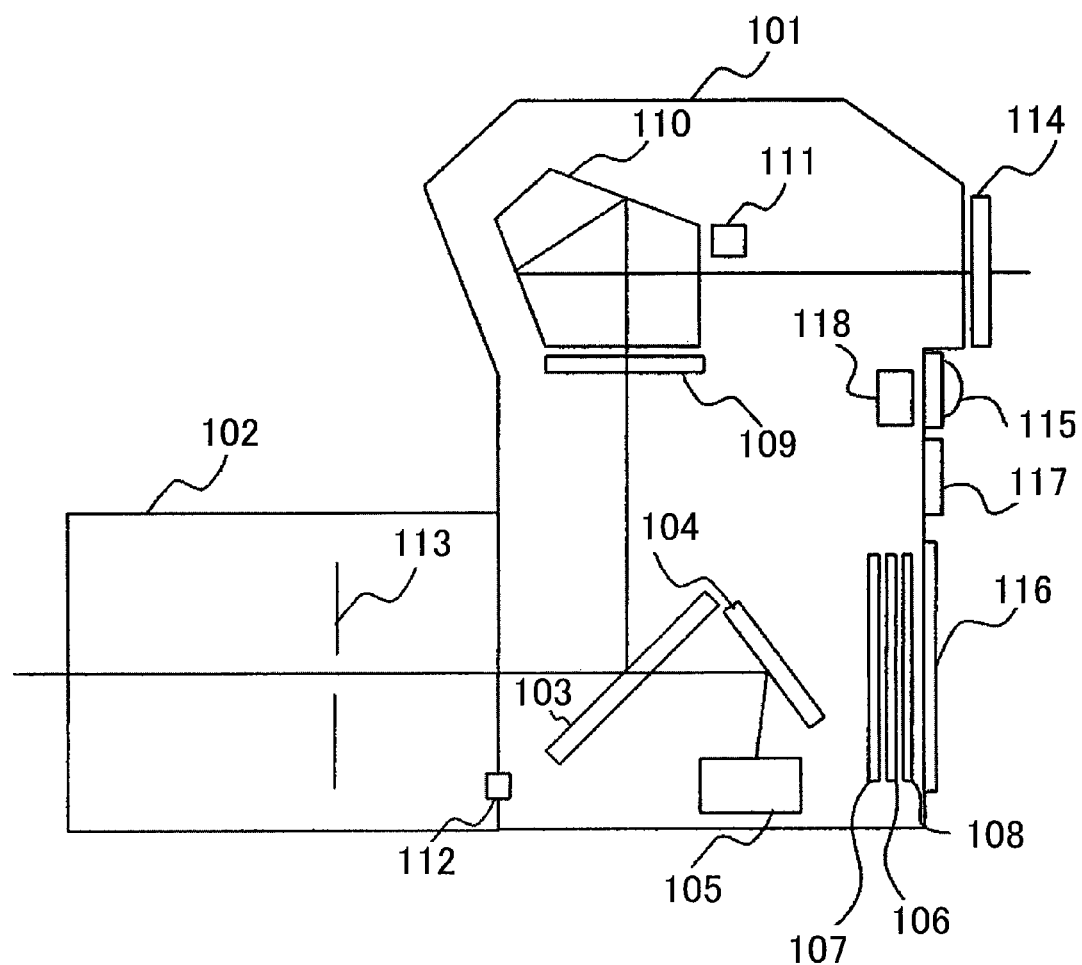
FIG. 1 is a schematic diagram illustrating a configuration of a camera that is Embodiment 1 of the present invention.

FIG. 1 illustrates a configuration of a camera that is Embodiment 1 of the present invention. Reference numeral 101 denotes a camera body, and an imaging lens (an image pickup optical system) 102 as an interchangeable lens is detachably mounted in front of the camera body 101. The camera body 101 and the imaging lens 102 are also electrically connected via a mount contact 112. A magnification varying lens and a focus lens (not shown) are provided in the imaging lens 102, and a stop 113 for adjusting a light intensity taken in the camera body 101 is provided.

Reference numeral 103 denotes a main mirror which is constituted by a half mirror. The main mirror 103 is obliquely arranged on an imaging optical path in a finder observation state, and reflects a part of the luminous flux from the imaging lens 102 to a finder optical system and transmits the other part of the luminous flux. The luminous flux transmitting through the main mirror 103 is reflected on a sub mirror 104 to enter an AF unit 105. The main mirror 103 is evacuated out of the imaging optical path in an imaging state.

The AF unit 105 includes a sensor portion having five line sensors illustrated in FIG. 13B and a secondary imaging optical system which divides luminous flux passing through an area corresponding to each focus detection point illustrated in FIG. 2 in the imaging lens 102 into two luminous fluxes to form a pair of object images on the line sensor. The photoelectric conversion element block in the line sensor performs a photoelectric conversion of the pair of object images to output a pair of image signals.

A camera CPU 118 performs a correlation calculation for the pair of image signals to calculate a phase difference of the pair of image signals. Then, the camera CPU 118 calculates a defocus amount as focus information indicating a focus state of the imaging lens 102 based on the phase difference. Furthermore, the camera CPU 118 calculates a movement amount of the focus lens needed for obtaining an in-focus state of the imaging lens 102 based on the defocus amount. The calculated movement amount is transmitted to a lens CPU (not shown) in the imaging lens 102. The lens CPU moves the focus lens in accordance with the received movement amount. Thus, the AF by using a TTL phase difference detection method is performed. A focus detector is constituted by the AF unit 105 and the camera CPU 118.

The camera CPU 118 functions as a block dividing portion which performs a process of dividing the photoelectric conversion element block in the line sensor of the AF unit 105, and also functions as a focus controller which controls the AF. Furthermore, the camera CPU 118 functions as an imaging controller which controls the imaging operation described below. The camera CPU 118 is provided with a storage portion (not shown) in which a computer program or data needed for controlling the AF or the imaging operation are stored.

Reference numeral 108 denotes an image pickup element which is constituted by a CCD sensor or a CMOS sensor. Reference numeral 106 denotes a low-pass filter which is arranged in front of the image pickup element 108. Reference numeral 107 denotes a focal plane shutter which controls an exposure amount of the image pickup element 108.

Reference numeral 109 denotes a focusing screen, and reference numeral 110 denotes a pentaprism. Reference numeral 114 denotes an eyepiece. The finder optical system is constituted by the focusing screen 109, the pentaprism 110, and the eyepiece 114. In the finder observation state, a photographer (a user) observes the focusing screen 109 via the eyepiece 114 to be able to observe the object and the focus detection point in the image taking region. Reference numeral 111 denotes an AE unit which performs photometry using the luminous flux from the pentaprism 110.

Reference numeral 115 denotes a release button. When the release button 115 is pressed halfway to turn an imaging preparation switch SW1 (not shown) on, the imaging preparation operation such as AE and AF is performed. Furthermore, when the release button 115 is completely pressed to turn the imaging start switch SW2 (not shown) on, the focal plane shutter 107 is operated to expose the image pickup element 108 and the imaging process is performed.

Reference numeral 116 denotes a display unit which is provided at the back of the camera body 101, and is constituted by a liquid crystal panel, an organic EL panel, or the like. The display unit 116 displays an image generated by taking the image or various kinds of information related to the imaging.

Reference numeral 117 denotes a focus detection point selecting switch, which includes operation keys arranged at the left, right, top, and bottom and an operation key arranged at the center. The operation of the operation keys arranged at the left, right, top, and bottom enables to select the focus detection point. The operation of the operation key arranged at the center enables to switch a focus detection point selection mode between an arbitrary selection mode and an automatic selection mode.

In the arbitrary selection mode, the camera CPU 118 makes the photographer select one arbitrary focus detection point (a used focus detection point) by the operation of the operation keys arranged at the left, right, top, and bottom in the focus detection point selecting switch 117. Then, the camera CPU 118 performs the AF based on the defocus amount obtained at the used one focus detection point. On the other hand, in the automatic selection mode, the camera CPU 118 makes the photographer select the focus detection mode by the operation of the operation key arranged at the center in the focus detection point selecting switch 117. Then, the camera CPU 118 selects one used focus detection point in accordance with a predetermined algorithm based on a defocus amount at a plurality of effective focus detection points in the selected focus detection mode to perform the AF based on the defocus amount obtained at the used one focus detection point.

Figure 3A:
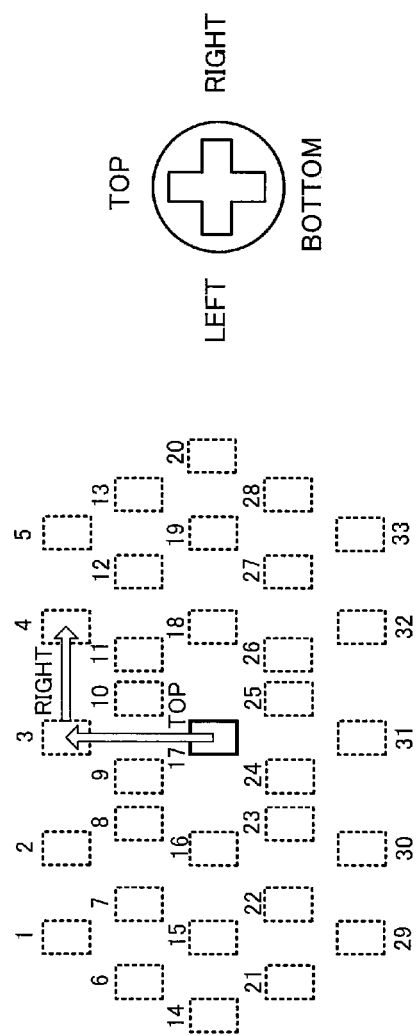
FIGS. 3A and 3B are diagrams describing a method of selecting focus detection points in a camera of Embodiment 1.

FIG. 3A illustrates a method of selecting the used focus detection point by the focus detection point selecting switch 117 in the arbitrary selection mode. When one of the operation keys arranged at the left, right, top, and bottom in the focus detection point selecting switch 117 is operated, the arbitrary selection mode is selected. In the arbitrary selection mode, a focus detection point 17 at the center is set as a default used focus detection point. For example, when the used focus detection point is to be changed from the focus detection point 17 to a focus detection point 4, the operation key arranged at top in the focus detection point selecting switch 117 is operated and then the operation key arranged at the right is operated.

Figure 3B:
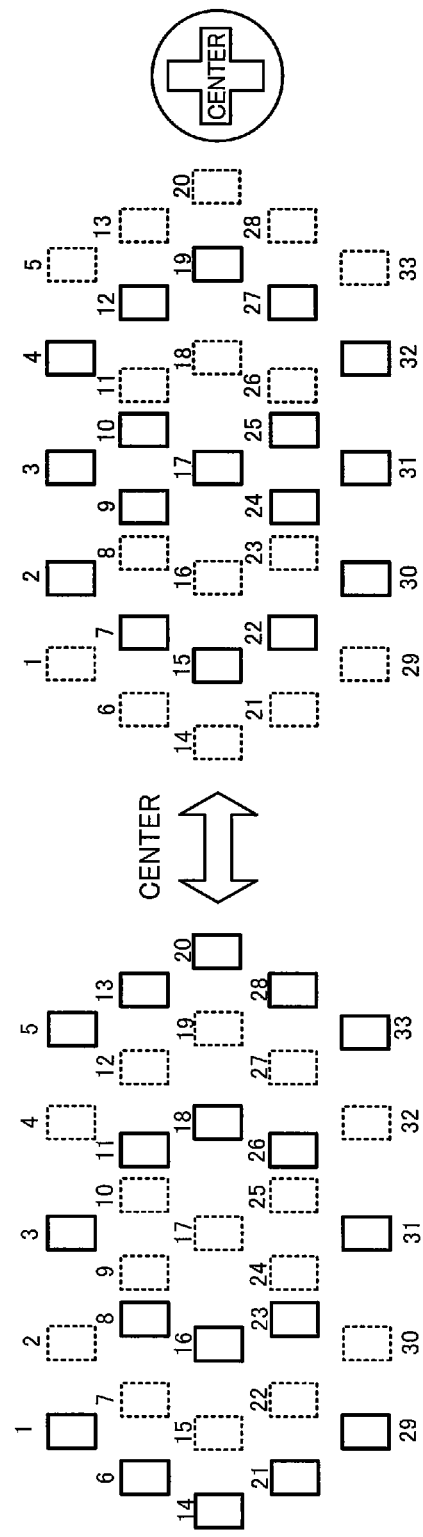

FIG. 3B illustrates a method of selecting a focus detection point arranging mode (i.e. the bock division pattern) in the automatic selection mode. When the operation key arranged at the center of the focus detection point selecting switch 117 is operated, the automatic selection mode is set. In the automatic selection mode, the A mode is set as a default focus detection point arranging mode. When the operation key arranged at the center is operated again, the focus detection point arranging mode is changed from the A mode to the B mode. Furthermore, when the operation key arranged at the center is operated, the focus detection point arranging mode is changed from the B mode to the A mode.

Figure 4:
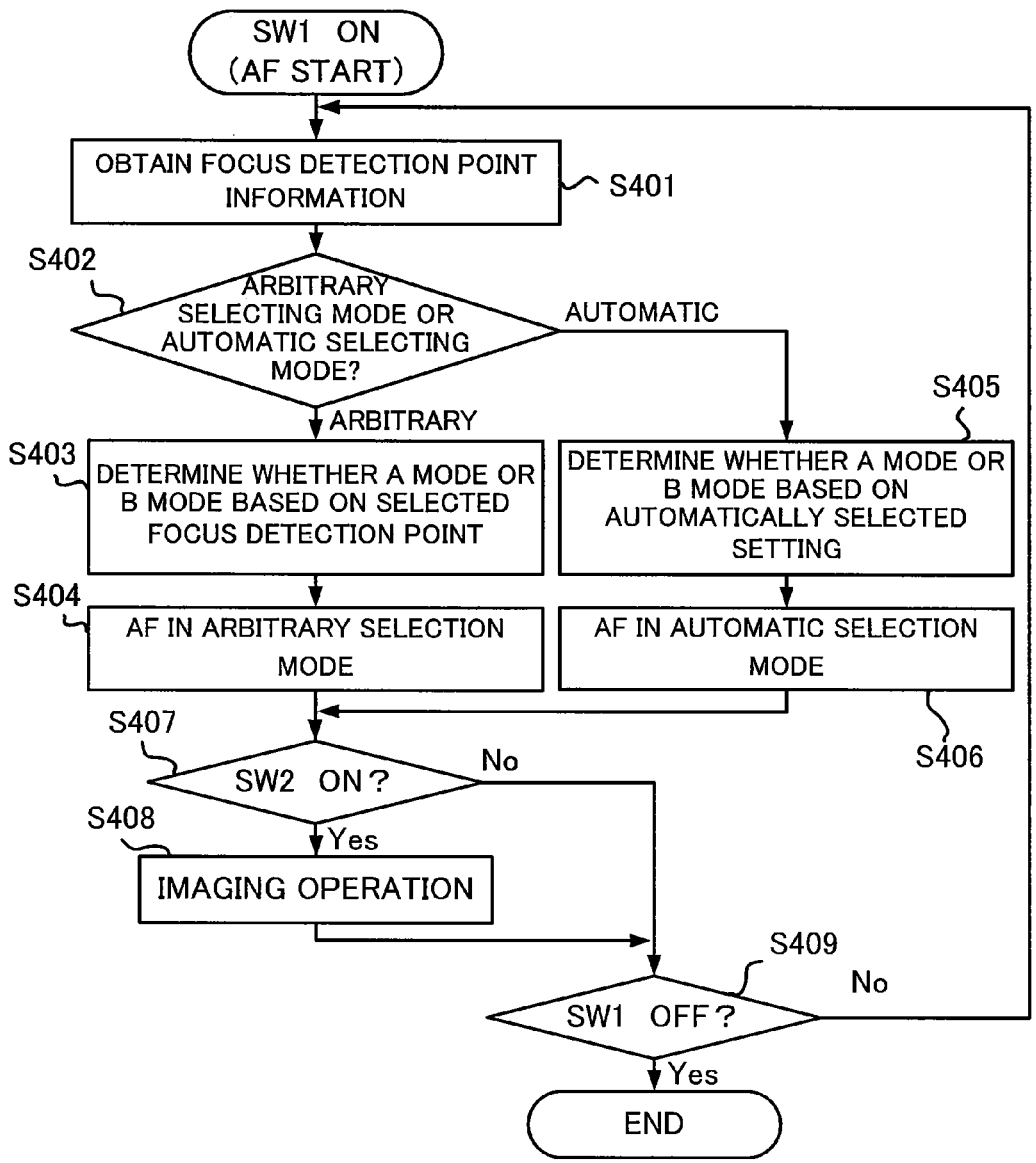
FIG. 4 is a flowchart illustrating an AF process in a camera of Embodiment 1.

Next, referring to a flowchart of FIG. 4, an AF process and an imaging process in the present embodiment will be described. The series of processes are performed by the camera CPU 118 in accordance with a computer program.

When the photographer turns the SW1 on, the camera CPU 118 starts the AF process.

First, in Step S401, the camera CPU 118 obtains focus detection point information which has been previously set by the operation of the focus detection point selecting switch 117. The focus detection point information includes information indicating the focus detection point selection mode (the arbitrary selection mode or the automatic selection mode) and information indicating a position of the used focus detection point or information indicating the focus detection point arranging mode (the A mode or the B mode) in the automatic selection mode.

In Step S402, the camera CPU 118 determines whether the focus detection point selection mode obtained in Step S401 is the arbitrary selection mode or the automatic selection mode. When the arbitrary selection mode is selected, the flow proceeds to Step S403. On the other hand, when the automatic selection mode is selected, the flow proceeds to Step S405.

In Step S403, the camera CPU 118 selects one of the A mode and the B mode based on the position of the used focus detection point obtained in Step S401. Specifically, when the used focus detection point is one of the focus detection points 1, 3, 5, 6, 8, 11, 13, 15, 16, 17, 18, 20, 21, 23, 26, 28, 29, 31, and 33 illustrated in FIG. 2, the A mode is selected. On the other hand, when the used focus detection point is one of the focus detection points 2, 4, 7, 9, 10, 12, 15, 19, 22, 24, 25, 27, 30, and 32, the B mode is selected. Then, the flow proceeds to Step S404.

In Step S404, the camera CPU 118 performs a division setting of a plurality of photoelectric conversion element blocks using a block division pattern which corresponds to the focus detection point arranging mode selected in Step S403. Subsequently, the camera CPU 118 performs a charge accumulation control in the photoelectric conversion element block corresponding to the used focus detection point to perform the AF in the arbitrary selection mode as described above. Then, the flow proceeds to Step S407.

On the other hand, in Step S405, the camera CPU 118 determines whether the focus detection point arranging mode selected by the photographer in the automatic selection mode is the A mode or the B mode to set the focus detection point arranging mode which corresponds to the determination result. Then, the flow proceeds to Step S406.

In Step S406, the camera CPU 118 divides each line sensor into a plurality of the photoelectric conversion element blocks using the block division pattern which corresponds to the focus detection point arranging mode set in Step S405. Subsequently, the camera CPU 118 performs a charge accumulation control in the plurality of divided photoelectric conversion element blocks to perform the AF in the automatic selection mode described above. Then, the flow proceeds to Step S407.

In Step S407, the camera CPU 118 determines whether the SW2 is turned on. When the SW2 is turned on, the flow proceeds to Step S408. On the other hand, the SW2 is not turned on, the flow proceeds to Step S409.

In Step S408, the camera CPU 118 controls the shutter 107, the image pickup element 108, and the stop 113 based on the photometry information obtained by the AE unit 111 to perform an imaging operation. Then, the flow proceeds to Step S409.

In Step S409, the camera CPU 118 determines whether the SW1 is turned off. When the SW1 is turned off, the present process is finished. On the other hand, when the SW1 is not turned off, the flow returns to Step S401.

As described above, the present embodiment switches the focus detection point arranging mode (the block division pattern) in accordance with the used focus detection point selected by the operation of the photographer in the arbitrary selection mode. Thus, a good image signal which corresponds to an object image (a pair of object images) existing at the selected used focus detection point can be obtained, and the accuracy of the AF (reliability) can be improved. Furthermore, because the charge accumulation by the line sensor can be performed at one time, the time required for the AF does not increase.

Also, in the automatic selection mode, the photographer previously sets the focus detection point arranging mode (the block division pattern) to be able to appropriately arrange an effective focus detection point with respect to the composition intended by the photographer. As a result, a good image signal which corresponds to the object image (the pair of object images) included in the used focus detection point can be obtained and the accuracy (reliability) of the AF can be improved.

As described above, in both the A mode and the B mode, the focus detection point arranged at the center is commonly set as an effective focus detection point. This is because the burden in switching the mode can be reduced by performing the AF without switching the A mode and the B mode with respect to a main object since the main object that is an imaging object exists at the center of the image-taking region in many cases.

Embodiment 2

Next, Embodiment 2 of the present invention will be described. The configuration of a camera in the present embodiment is basically the same as that described in Embodiment 1 (FIG. 1). However, the arrangement of the line sensor in the AF unit 105 is different from that of Embodiment 1.

Figure 5A:
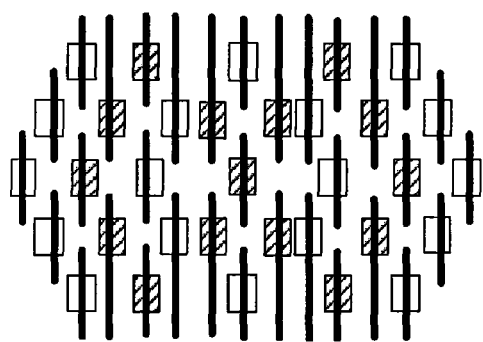
FIGS. 5A and 5B are diagrams illustrating line sensors (vertical lines) in a camera that is Embodiment 2 of the present invention.
Figure 5B:
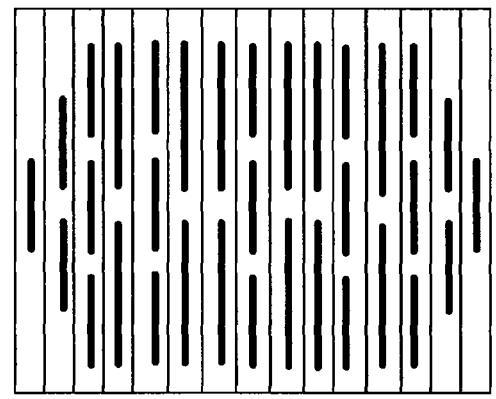

The AF unit 105 of the present embodiment includes a plurality of vertical line sensors where a plurality of photoelectric conversion elements are arranged in a vertical direction as illustrated in FIG. 5B in addition to a plurality of horizontal line sensors where a plurality of photoelectric conversion elements are arranged in a horizontal direction as illustrated in FIG. 13B. The horizontal line sensor corresponds to a first line sensor where the photoelectric conversion elements are arranged in a first direction, and the vertical line sensor corresponds to a second line sensor where the photoelectric conversion elements are arranged in a second direction different from the first direction.

In each vertical line sensor, as indicated by a bold solid line in the drawing, one or a plurality of photoelectric conversion element blocks are set. In the image taking region, thirty-three photoelectric conversion element blocks corresponding to thirty-three focus detection points are set.

The vertical line sensors divided into a plurality of photoelectric conversion element blocks are set so that the plurality of photoelectric conversion element blocks are not overlapped with each other.

Figure 6:
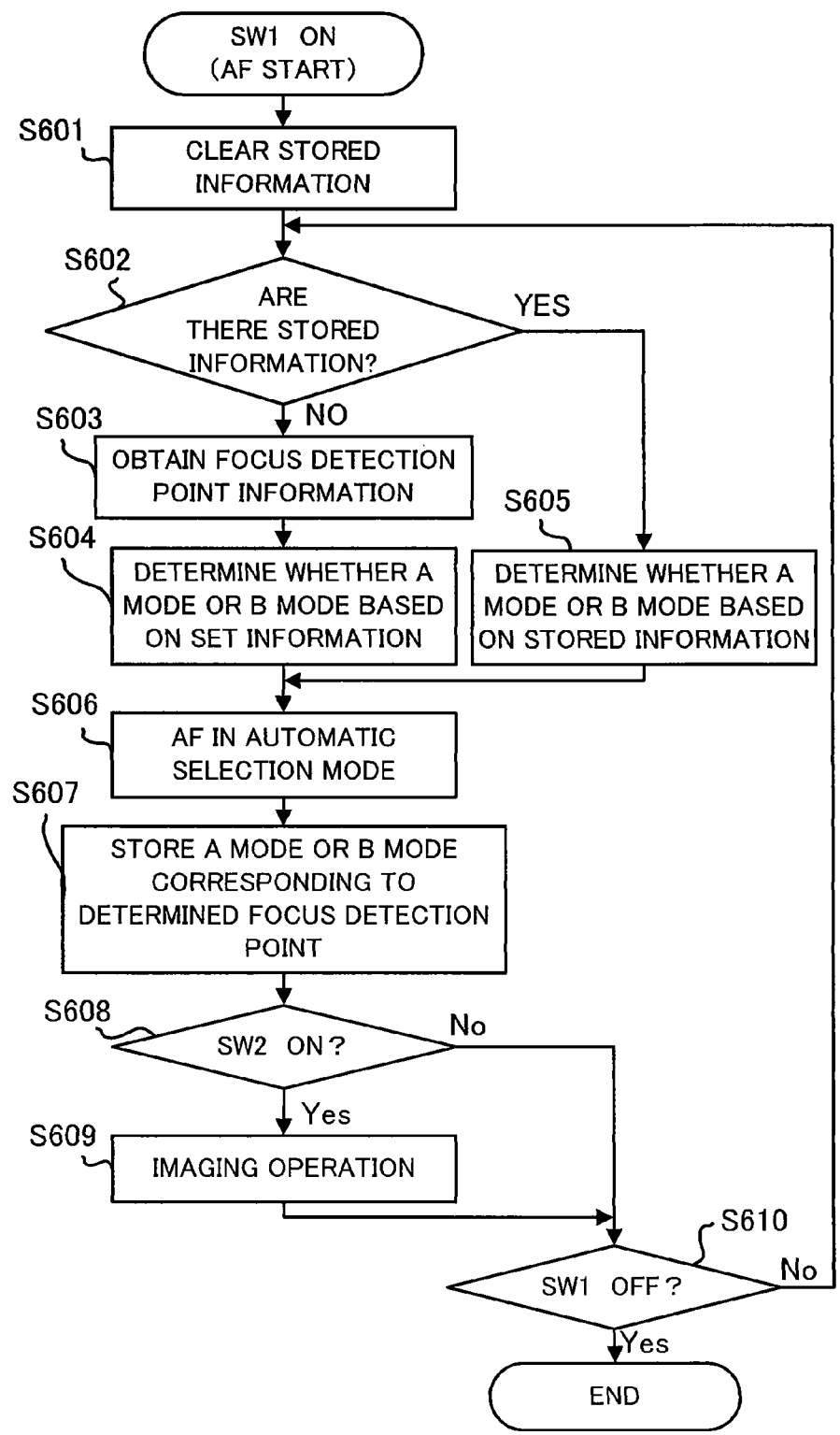
FIG. 6 is a flowchart illustrating an AF process in a camera of Embodiment 2.

Referring to a flowchart of FIG. 6, the AF process and the imaging process in the present embodiment will be described. The series of processes are performed by the camera CPU 118 in accordance with a computer program.

When the SW1 is turned on by the photographer, the camera CPU 118 starts the AF process. Hereinafter, the AF process in the automatic selection mode will be described.

First, in Step S601, the camera CPU 118 clears information of the focus detection point arranging mode (the A mode or the B mode) stored in a storage portion in the camera CPU 118.

Next, in Step S602, the camera CPU 118 determines whether the information of the focus detection point arranging mode are stored in the storage portion. When the focus detection point arranging mode is stored, the flow proceeds to Step S603. On the other hand, when the focus detection point arranging mode is not stored, the flow proceeds to Step S605.

It Step S603, the camera CPU 118 obtains focus detection point information previously set by the operation of the focus detection point selecting switch 117. The focus detection point information is information indicating the focus detection arranging mode (the A mode or the B mode). Then, the flow proceeds to Step S604.

In Step S604, the camera CPU 118 sets the focus detection point arranging mode which corresponds to the information of the focus detection point arranging mode obtained in Step S603. Then, the flow proceeds to Step S606.

On the other hand, in Step S605, the camera CPU 118 sets the focus detection point arranging mode in accordance with the information of the focus detection point arranging mode stored in the storage portion. Then, the flow proceeds to Step S606.

In Step S606, the camera CPU 118 divides the horizontal line sensor into a plurality of photoelectric conversion element blocks by a block division pattern which corresponds to the focus detection point arranging mode set in Step S604 or Step S605. Subsequently, the camera CPU 118 performs a charge accumulation control in the plurality of photoelectric conversion element blocks. Furthermore, the camera CPU 118 performs a charge accumulation control in one or a plurality of photoelectric conversion element blocks using the vertical line sensor.

Then, the camera CPU 118 determines which focus detection points the main object exists in the image taking region. In the embodiment, the camera CPU 118 determines the focus detection point (the used focus detection point) where the main object exists based on the information of the focus detection point arranging modes of the A mode and the B mode with respect to the horizontal line sensor and the information of a defocus amount obtained by the vertical line sensor. For example, in the A mode, the defocus amount is obtained at nineteen effective focus detection points illustrated in FIG. 13A with respect to the horizontal direction. In this case, in the vertical line sensor, the defocus amount is obtained treating all the thirty-three focus detection points as effective focus detection points. Then, the used focus detection point where the main object exists is determined based on the defocus amount obtained at the nineteen effective focus detection points in the horizontal direction and the defocus amount obtained at the thirty-three effective focus detection points in the vertical direction. After determining the used focus detection point, the camera CPU 118 performs the AF so that an in-focus state can be obtained with respect to the object existing at the used focus detection point. Then, the flow proceeds to Step S607.

In Step S607, the camera CPU 118 stores the focus detection point arranging mode (the A mode or the B mode) which corresponds to the used focus detection point selected in Step S606 in the storage portion.

Specifically, when the used focus detection point is one of the focus detection points 1, 3, 5, 6, 8, 11, 13, 15, 16, 17, 18, 20, 21, 23, 26, 28, 29, 31, and 33 illustrated in FIG. 2, the A mode is stored in the storage portion. On the other hand, when the used focus detection point is one of the focus detection points 2, 4, 7, 9, 10, 12, 15, 19, 22, 24, 25, 27, 30, and 32, the B mode is stored in the storage portion. Then, the flow proceeds to Step S608.

In Step S608, the camera CPU 118 determines whether the SW2 is turned on. When the SW2 is turned on, the flow proceeds to Step S609. On the other hand, when the SW2 is not turned on, the flow proceeds to Step S610.

In Step S609, the camera CPU 118 controls the shutter 107, the image pickup element 108, and the stop 113 based on the photometry information obtained by the AE unit 111 to perform an imaging operation. Then, the flow proceeds to Step S610.

In Step S610, the camera CPU 118 determines whether the SW1 is turned off. When the SW1 is turned off, the present process is finished. On the other hand, when the SW1 is not turned off, the flow returns to Step S602.

As described above, in the present embodiment, the focus detection point arranging mode (the A mode or the B mode) in the subsequent AF is switched in accordance with the used focus detection point selected in the automatic selection mode. Thus, even if the object is moved from the original composition while the AF is continuously performed, the AF can be performed using an appropriate focus detection point arranging mode.

In some cases, the AF is performed by only using the vertical line sensor when the object is moved. However, the AF can be performed based on the defocus amount obtained from both the horizontal line sensor and the vertical line sensor by switching the focus detection point arranging mode in performing the subsequent AF. Therefore, the accuracy of the AF can be improved.

Embodiment 3

Next, Embodiment 3 of the present invention will be described. The configuration of a camera in the present embodiment is basically the same as that described in Embodiment 1 (FIG. 1). However, the arrangement of the line sensor in the AF unit 105 is different from that of Embodiment 1.

Figure 7:
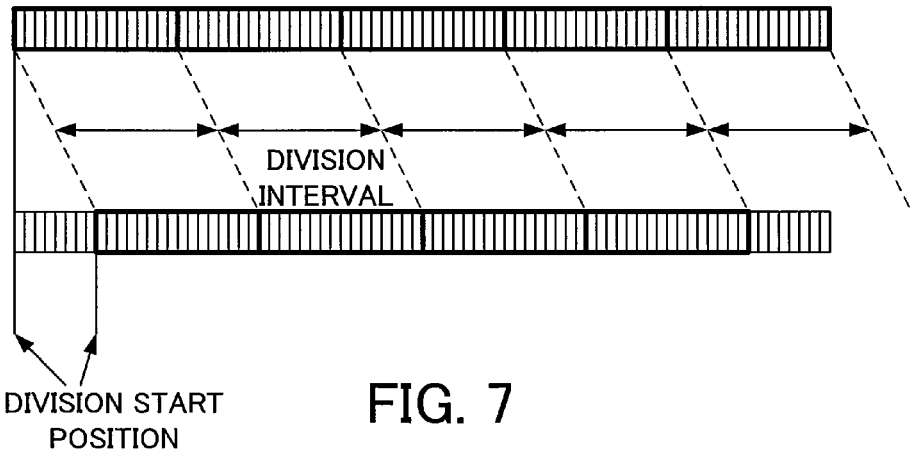
FIG. 7 is a diagram describing a method of dividing a line sensor in a camera that is Embodiment 3 of the present invention.

In Embodiments 1 and 2, the configuration of two block division patterns as illustrated in FIG. 13A is described, but in the present embodiment, as illustrated in FIG. 7, the line sensor is divided at constant intervals (divided by the constant number of the photoelectric conversion elements) and also its division start position can be arbitrarily set. In the embodiment, the constant interval may be determined in accordance with a detectable defocus amount, or may also be determined based on optical characteristics of the imaging lens 102.

Figure 8:
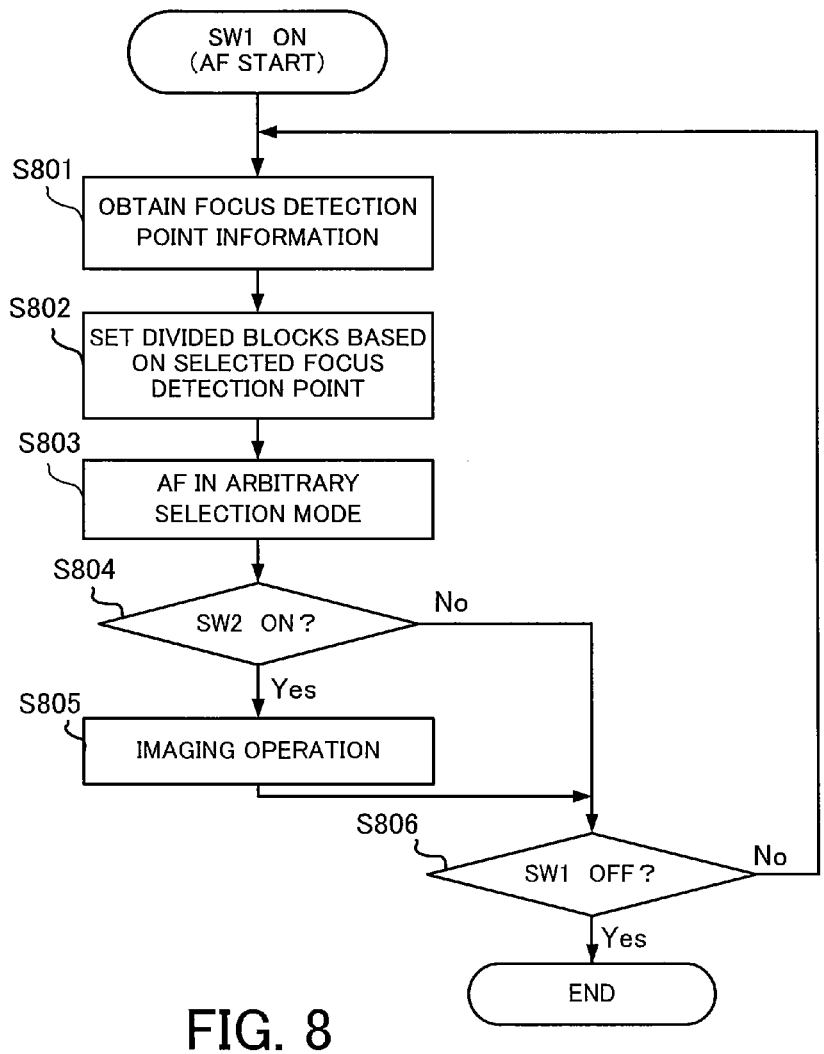
FIG. 8 is a flowchart illustrating an AF process in a camera that is Embodiment 3.

Referring to a flowchart of FIG. 8, the AF process and the imaging process in the present embodiment will be described. The series of processes are performed by the camera CPU 118 in accordance with a computer program.

When the SW1 is turned on by the photographer, the camera CPU 118 starts the AF process. In the embodiment, the AF process in the arbitrary selection mode will be described.

First, in Step S801, the camera CPU 118 obtains focus detection point information previously set by the operation of the focus detection point selecting switch 117. In the embodiment, the focus detection point information is information indicating a position of the used focus detection point.

Next, in Step S802, the camera CPU 118 sets (changes) the block division pattern in accordance with the position of the used focus detection point obtained in Step S801. FIG. 9 illustrates a setting example of the block division pattern in the line sensor which constitutes a plurality of focus detection points including a focus detection point at a center. The line sensor performs a photoelectric conversion for generating an image signal when one of the focus detection points 14 to 20 illustrated in FIG. 2 is selected as the used focus detection point.

Figure 9A:
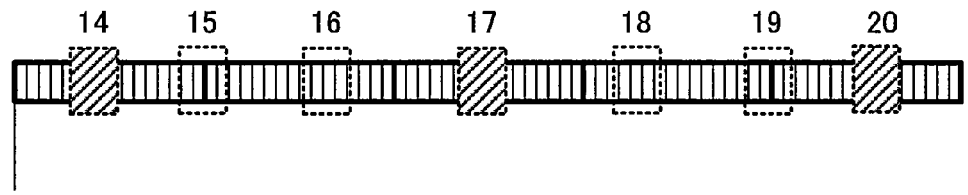
FIGS. 9A to 9D are diagrams illustrating a relationship between selected focus detection points and a method of dividing a line sensor in a camera of Embodiment 3.
Figure 9B:
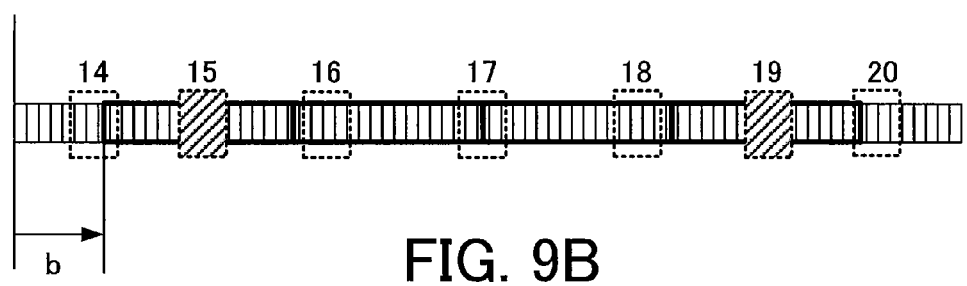
Figure 9C:
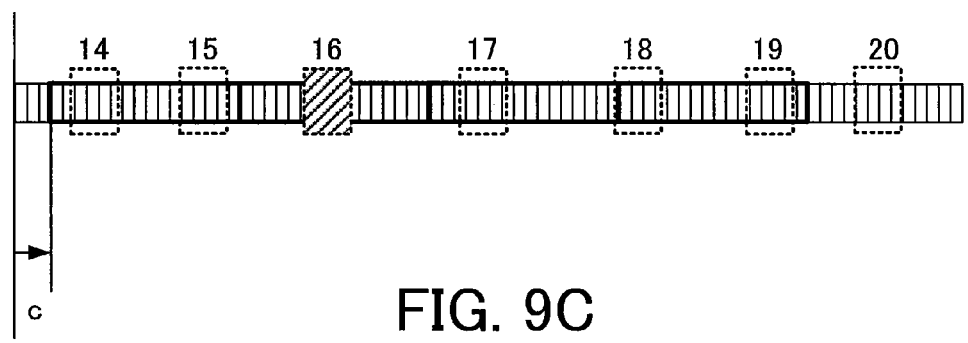
Figure 9D:
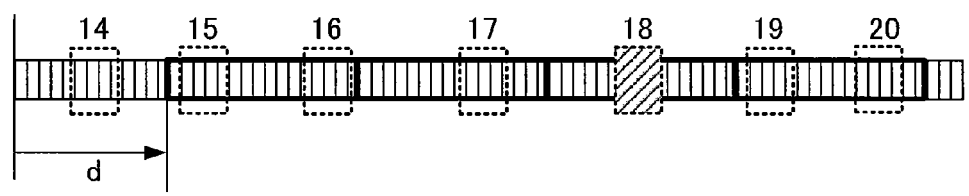
Figure 10A:
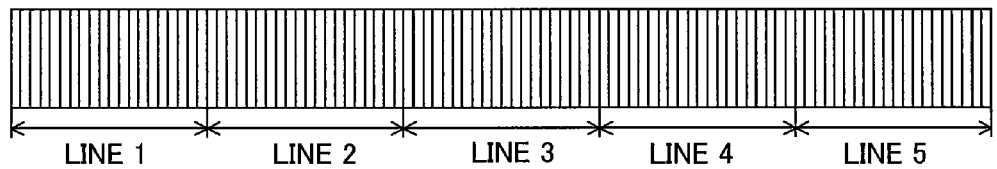
FIGS. 10A and 10B are diagrams illustrating a method of dividing a line sensor in a conventional camera.
Figure 10B:
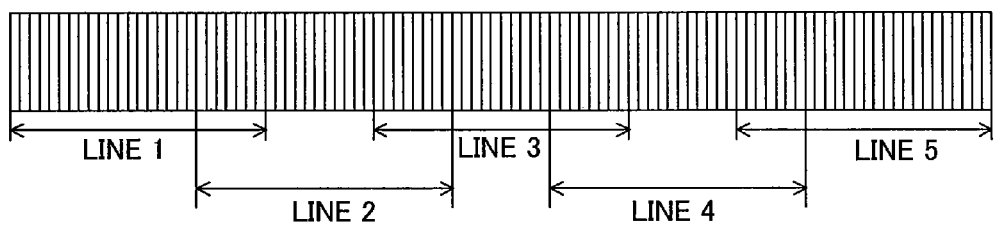
Figure 11:
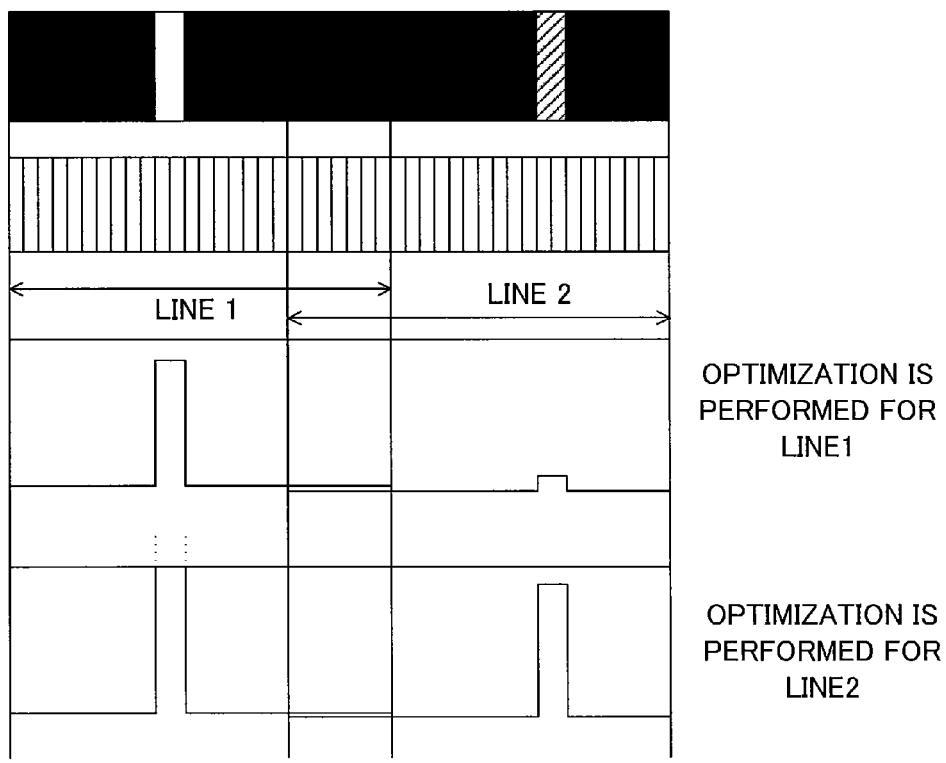
FIG. 11 is a diagram illustrating an example of charge accumulation by a line sensor in a conventional camera.
Figure 12:
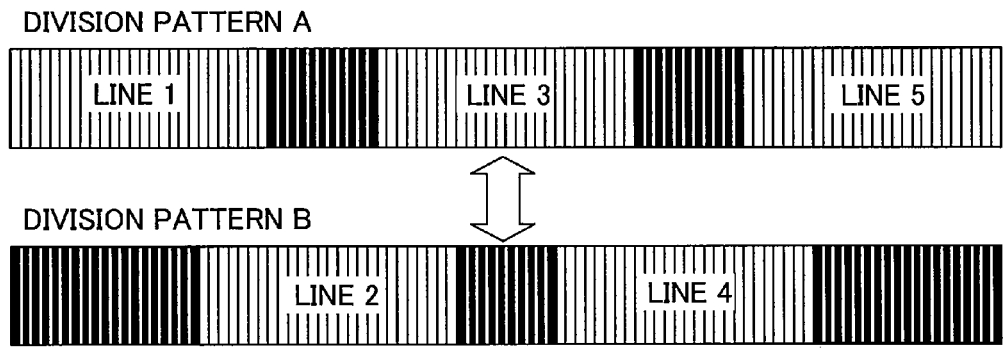
FIG. 12 is a diagram describing a switch of division patterns of a line sensor in a conventional camera.

When one of the focus detection points 14, 17, and 20 is selected as the used focus detection point, as illustrated in FIG. 9A, the division start position is set to a head pixel of the line sensor. When one of the focus detection points 15 and 19 is selected as the used focus detection point, as illustrated in FIG. 9B, the division start position is set to the b-th pixel from the head pixel of the line sensor. When the focus detection point 16 is selected as the used focus detection point, as illustrated in FIG. 9C, the division start position is set to the c-th pixel from the head pixel of the line sensor. Furthermore, when the focus detection point 18 is selected as the used focus detection point, as illustrated in FIG. 9D, the division start position is set to the d-th pixel from the head pixel of the line sensor.

In Step S803, the camera CPU 118 divides each line sensor into a plurality of photoelectric conversion element blocks using the block division pattern set in Step S802. Then, the camera CPU 118 performs a charge accumulation control in the photoelectric conversion element block corresponding to the used focus detection point to perform the AF in the arbitrary selection mode described above. Then, the flow proceeds to Step S804.

In Step S804, the camera CPU 118 determines whether the SW2 is turned on. When the SW2 is turned on, the flow proceeds to Step S805. On the other hand, when the SW2 is not turned on, the flow proceeds to Step S806.

In Step S805, the camera CPU 118 controls the shutter 107, the image pickup element 108, and the stop 113 based on the photometry information obtained by the AE unit 111 to perform the imaging operation. Then, the flow proceeds to Step S806.

In Step S806, the camera CPU 118 determines whether the SW1 is turned off. When the SW1 is turned off, the present process is finished. On the other hand, when the SW1 is not turned off, the flow returns to Step S801.

As described above, in the present embodiment, the division start position of the photoelectric conversion element block is set in accordance with the used focus detection point selected in the arbitrary selection mode. Thus, a good image signal which corresponds to an object image (a pair of object images) existing at the selected used focus detection point can be obtained, and the accuracy (reliability) of the AF can be improved.

If the block division pattern can be set for each line sensor, the focus detection point arranging pattern in the A mode or the B mode described in Embodiments 1 and 2 can also be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to each of the above embodiments, the division pattern of a plurality of photoelectric conversion element blocks in a line sensor is appropriately switched to provide a large number of focus detection areas and to obtain an appropriate image signal corresponding to an object to be focused. Therefore, the reliability of the focus detection result can be improved. Accordingly, an image pickup apparatus with high AF accuracy (reliability) can be provided.

This application claims the benefit of Japanese Patent Application No. 2009-164325, filed on Jul. 13, 2009, which is hereby incorporated by reference herein in its entirety.

What is claimed is:

1. An image pickup apparatus comprising:
a first line sensors which have a plurality of photoelectric conversion elements, wherein the first line sensors output signals of a pair of object images;
second line sensors which have a plurality of photoelectric conversion elements and are arranged in a direction different from the first line sensors, wherein the second line sensors output signals of a pair of object images;
a focus detector configured to detect a focus state corresponding to a focus state detecting area based on the pair of image signals outputted from the first line sensors and the second line sensors; and
a controller configured to divide a region of the first line sensors into a plurality of regions related to the focus state detecting area, wherein number of regions divided by the controller is different between a first mode and a second mode,
wherein the controller selects the first mode and the second mode based on output results of the first line sensors and the second line sensors.

2. An image pickup apparatus according to claim 1, wherein the controller changes a pattern to the divided regions of the first line sensors in accordance with an arrangement of the focus state detecting areas selected by the operation of the user.

3. An image pickup apparatus according to claim 1, wherein the controller changes a division start position of the plurality of regions related to the first line sensors in accordance with the mode.

4. An image pickup apparatus according to claim 1, wherein the focus detector detects a focus state of the image pickup optical system based on an output signal corresponding to at least one of the plurality of regions.

5. An image pickup apparatus according to claim 1, wherein number of the signals of the pair of object images output from the second line sensors is larger than that output from the first line signals.

6. An image pickup apparatus according to claim 1, wherein a direction in which the second line sensors is arranged is vertical to that in which the first line sensors is arranged.

7. An image pickup apparatus according to claim 1, the focus detector repeats detection of the focus state.

8. An image pickup apparatus comprising:
a first line sensor and a second line sensor each constituted by a plurality of photoelectric conversion elements and capable of performing a photoelectric conversion of a pair of object images formed by luminous flux from an image pickup optical system, the plurality of photoelectric conversion elements of the first line sensor and the second line sensor being arranged in a first direction and a second direction different from the first direction, respectively;
a focus detector configured to detect a focus state of the image pickup optical system based on a pair of image signals outputted from each of the first and second line sensors performing the photoelectric conversion of the pair of object images; and
a block dividing portion configured to divide the first line sensor into a plurality of photoelectric conversion element blocks to form a plurality of effective focus detection areas in the first direction in an image taking region,
wherein the block dividing portion changes a pattern by which the first line sensor is divided into the plurality of photoelectric conversion element blocks so that an arrangement of the effective focus detection areas is switched in accordance with the focus state detected based on the image signals outputted from the second line sensor.

* * * * *